United States Patent [19]

Chamberlin et al.

[11] Patent Number: 4,817,132

[45] Date of Patent: Mar. 28, 1989

[54] MULTI-LINE ACCESS MODULE FOR TELEPHONE SET

[75] Inventors: David B. Chamberlin, Monroe; Nicholas A. D'Agosto, III, Trumbull; Ernest D. Hoffman, Stamford, all of Conn.

[73] Assignee: Dictaphone Corporation, Stratford, Conn.

[21] Appl. No.: 101,301

[22] Filed: Sep. 25, 1987

[51] Int. Cl.⁴ .............................................. H04M 1/00
[52] U.S. Cl. .................................. 379/165; 379/162; 379/164; 379/387; 379/201
[58] Field of Search ............... 379/165, 156, 164, 163, 379/162, 166, 214, 157, 201, 387

[56] References Cited

U.S. PATENT DOCUMENTS

| | | | |
|---|---|---|---|
| 3,931,481 | 1/1976 | Jackson | 379/163 |
| 4,061,887 | 12/1977 | Kasson et al. | 379/164 |
| 4,395,596 | 7/1983 | Leitman et al. | 379/156 |
| 4,490,583 | 12/1984 | Bednarz et al. | 379/158 |
| 4,628,153 | 12/1986 | Daly | 379/163 |
| 4,677,661 | 6/1987 | van Gilluwe et al. | 379/159 |

Primary Examiner—Jin F. Ng
Assistant Examiner—Wing F. Chan
Attorney, Agent, or Firm—Robert H. Whisker; Melvin J. Scolnick; David E. Pitchenik

[57] ABSTRACT

A multiline access module for connection of a number of telephone lines to a station set. The station set is controlled by a microprocessor and communicates with the access module through a communications channel to select one telephone line for connection to the station and to read the line status, ringing, on-hook, seized, no connection, or hold, for each line; the microprocessor controlling audible and visual indicators accordingly. The access module monitors voltage levels on each line to determine the line status. Each access module includes apparatus for connection to first and second groups of telephone lines and when two modules are interconnected by an appropriately polarized cable each will activate a different connection apparatus, allowing two modules to be connected in parallel for greater line capacity.

15 Claims, 9 Drawing Sheets

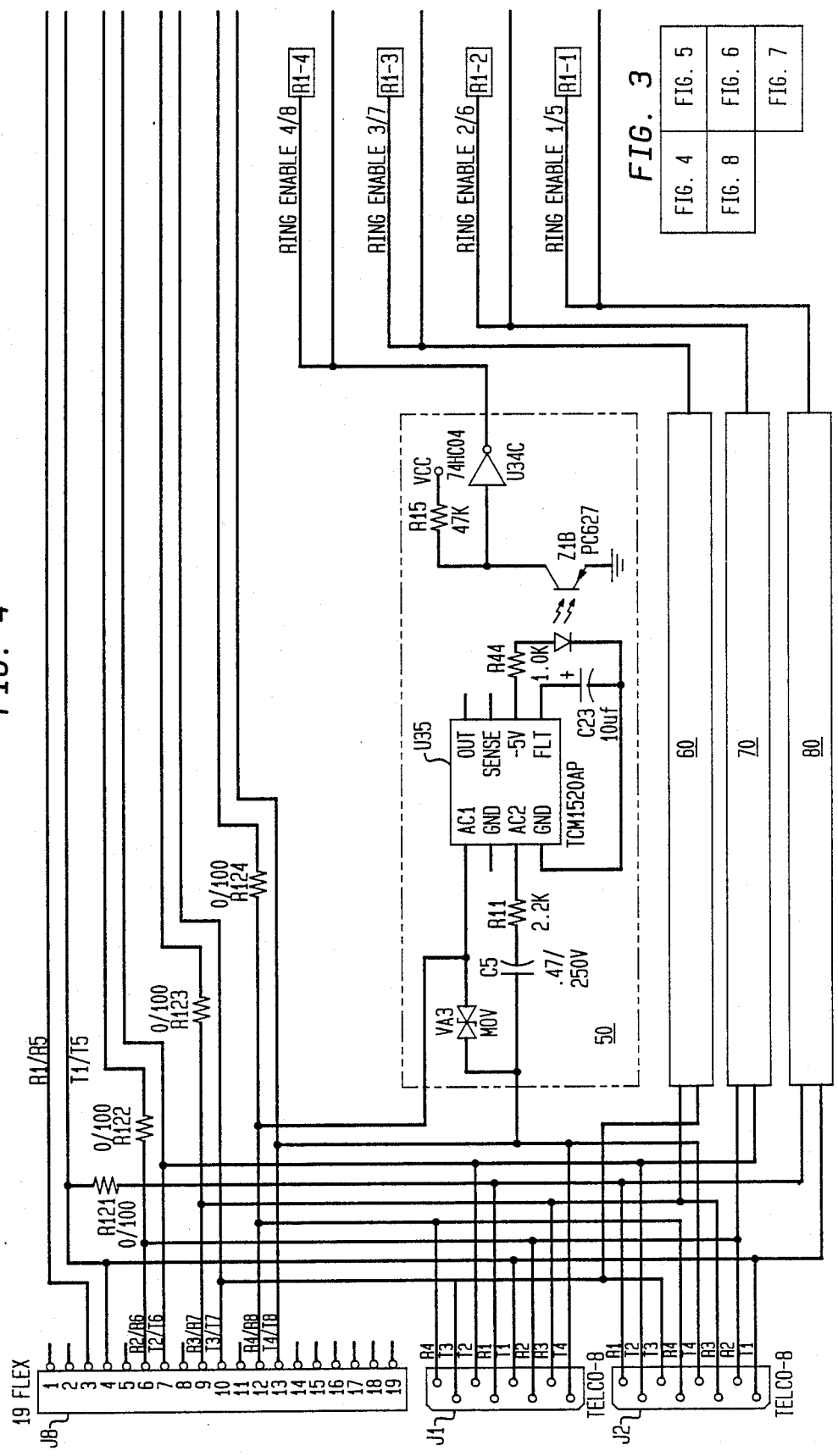

MULTI-LINE ACCESS MODULE FOR TELEPHONE SET

BACKGROUND OF THE INVENTION

1. Field of the Invention

Techniques for establishing a connection between the central office in a telephone network (or other switching system such as a local PBX) and a particularly station set are, of course, well known. A telephone line consisting of a pair of conductors, historically referred to as tip and ring, connects the central office to a particular station set. The central office equipment supplies an operating line voltage, typically a nominal −48 or −24 volts, across the tip and ring pair and monitors the line to detect when the station set has "seized" the line (i.e. someone has taken the station set receiver "off-hook"). Because the distance from central offices to particular station sets will vary greatly, central offices monitor the current flow in a telephone line, and line seizure is established by the station set connecting an impedance between tip and ring to establish a loop. When a call is waiting for a particular station set, the central office will vary the potential between tip and ring in a periodic fashion to generate a ring signal. This ring signal is detected in the station set which typically then generates an audible signal to indicate a call.

This simple system has worked well for decades in the telephone network to connect single station sets to central offices, or other switching systems through a single line, but presents problems in connecting a number of lines to one or more station sets. Such installations are typically referred to as key set equipment, or "1A2" equipment, and provide the well known "push button telephone" and a central control connected to each individual station set by a multiconductor cable. This central control responds to signals from the station set to activate one of a number of telephone lines connected to the station set, and also to place selected lines on hold and provide line status indicator signals to control indicator lamps associated with each telephone line at the station set. Such central control and system wiring for such key set equipment is complex and costly; particularly for local systems involving only a small number of outside telephone lines and a small number of station sets. Further, each station set in such key set equipment is usually provided with the capacity for connection to the maximum number of telephone lines which can be controlled by the central control.

A recent solution to this problem has been provided by digital telephone switching equipment. Station sets connected to digital switching equipment typically are connected by one line to provide a voice signal path and a second, digital line which carries control signals between the switching equipment and the station set. Such digital switching equipment allows a great variety of sophisticated telephone functions, such as call forwarding, and is undoubtedly the direction in which the technology may be expected to move in the future. However, due to the enormous capital base invested in conventional tip and ring telephones, it is expected that for the foreseeable future, the ability to provide multi-line connection to conventional tip and ring telephone lines will be necessary.

It should also be noted that digital technology has been incorporated into station sets intended for use with conventional tip and ring telephone lines. Such station sets, sometimes referred to as "smart telephones" incorporate a microprocessor for control. A typical such phone is marketed by the assignee of the subject invention under the trademark "Connexions", and is described in commonly assigned U.S. patent application Ser. No. 895,017. Such "smart telephones" provide a number of input controls, in addition to the typical telephone keypad used for dialing. The microprocessor responds to these controls to implement such features as automatic dialing.

U.S. Pat. No. 4,490,583, to: Bednarz et al. is one proposed apparatus for the connection of a number of telephone lines to a single line tip and ring station set. The apparatus of Bednarz et al., however, is connected to the station set only through the tip and ring pair, and accordingly is not capable of taking advantage of the capabilities of modern "smart telephones". Thus, the apparatus of Bednarz et al. includes mechanically operated switch closures for selecting a particular telephone line and indicator lamps to indicate the status of each line. Further, the apparatus of Bednarz et al. is not capable of distinguishing a telephone line in a hold condition from a telephone line in a seized condition, and each controller as taught by Bednarz et al. must be separately connected to all other controllers to determine the status of the telephone lines.

Because the status of the lines in systems such as that taught in Bednarz and "keyset" equipment is communicated over separate lines, such systems will not release a hold condition on a line if the line is picked up by a conventional single line telephone; making the use of conventional single line telephones with such systems awkward and less than fully satisfactory to some users.

Thus, it is an object of the subject invention to provide a means for connection of multiple telephone lines to a single station set which does not require a central controller of the type usually used with key set equipment.

It is still another object of the subject invention to provide an apparatus for the connection of multiple telephone lines where a number of such apparatus maybe used with a corresponding number of station sets to connect a group of telephone lines to each of those stations sets without the need to interconnect the connection apparatus, and which is also suitable for use with conventional single line telephones.

Brief Summary of the Invention

The above objects are achieved and the disadvantages of the prior art are overcome in accordance with the subject invention by means of a multi-line telephone controller for controlling the connection of a number of telephone lines to a station set. The station set is of the type sometimes referred to as a "smart telephone" and includes input for connecting a telephone line, apparatus for establishing either a seized or an on-hook condition for a telephone line connected to the input, user inputs for input of user signals to select a telephone line, a communications channel for communication with the controller and a processor for transmitting and receiving information through the communications channel and for controlling the station set and the controller in accordance with information received through said channel and the user signals. The controller includes separate ring signal detectors connected to each of the telephone lines to be connected to the station set which generate a ring enable signal in response to a ring signal on the connected line, and ring status transmission apparatus responsive to the ring enable signals for transmitting the ring status of each of the telephone lines to the processor through the communications channel. The controller also includes switching apparatus for connecting a selected one of the telephone lines to the input of the station set in accordance with line selection signals transmitted by the processor through the communications channel.

In another embodiment the controller of the subject invention further includes signal generator circuits each one connected to the telephone lines and responsive to the voltage level on the connected line to generate an indicator control signal corresponding to the seized, on-hook, or ringing status of the connected line, the indicator control signals each controlling a separate indicator for the respective connected lines.

Another aspect of the subject invention includes a signal generator for use in a multi-line telephone controller to generate an indicator control signal corresponding to the status of a telephone line. The signal generator includes a comparator responsive to the voltage on telephone line to generate a plurality of digital outputs, logic circuitry for combining the digital outputs to generate a seized signal corresponding to a seized state of the telephone line, and a hold signal corresponding to a hold state of the telephone line, an AND circuit for logically ANDing the hold signal with a first time varying signal, and an OR circuit for logically ORing the seized signal with the hold signal and first time varying signal to generate the indicator control signal.

In another embodiment the signal generator further includes a second AND circuit for logically ANDing a ring enable signal with a second, distinct time varying signal and the OR circuit logically ORs the seized signal with the hold signal and the first time varying signal, and with the ring enable signal and the second time varying signal to generate the indicator control signal.

In another aspect the subject invention includes a multi-line telephone including a microprocessor controlled station set which includes a communications channel for communicating with multi-line telephone controllers, a plurality of multi-line telephone controllers, each of which includes a plurality of apparatus for controlling the connection to the station set of one line selected from a group of telephone lines, the number of such apparatus being at least equal to the number of controllers, and enabling circuitry for enabling one of the controlling apparatus for each of the controllers, each of the enabled controlling apparatus controlling a different group of telephone lines.

In another embodiment of the subject invention the telephone controllers each include circuitry for transmitting the status of each group of telephone lines, and further includes second enabling circuitry for enabling the status transmitting circuitry in a first one of the controllers and disabling the status transmission circuitry in all remaining telephone controllers.

Thus, it may be seen that the subject invention advantageously achieves the objects set forth above and overcomes the disadvantages of the prior art. Other objects and advantages of the subject invention will be apparent to those skilled in the art from consideration of the attached drawings and the detailed description set forth below.

BRIEF DESCRIPTION OF THE DRAWINGS

FIGS. 3 and 3A show the arrangement of FIGS. 4–8, and 9 and 10, respectively.

FIGS. 4–10 show a schematic diagram of a multi-line telephone controller in accordance with the subject invention.

DETAILED DESCRIPTION OF THE PREFERRED EMBODIMENT

Figure 1:
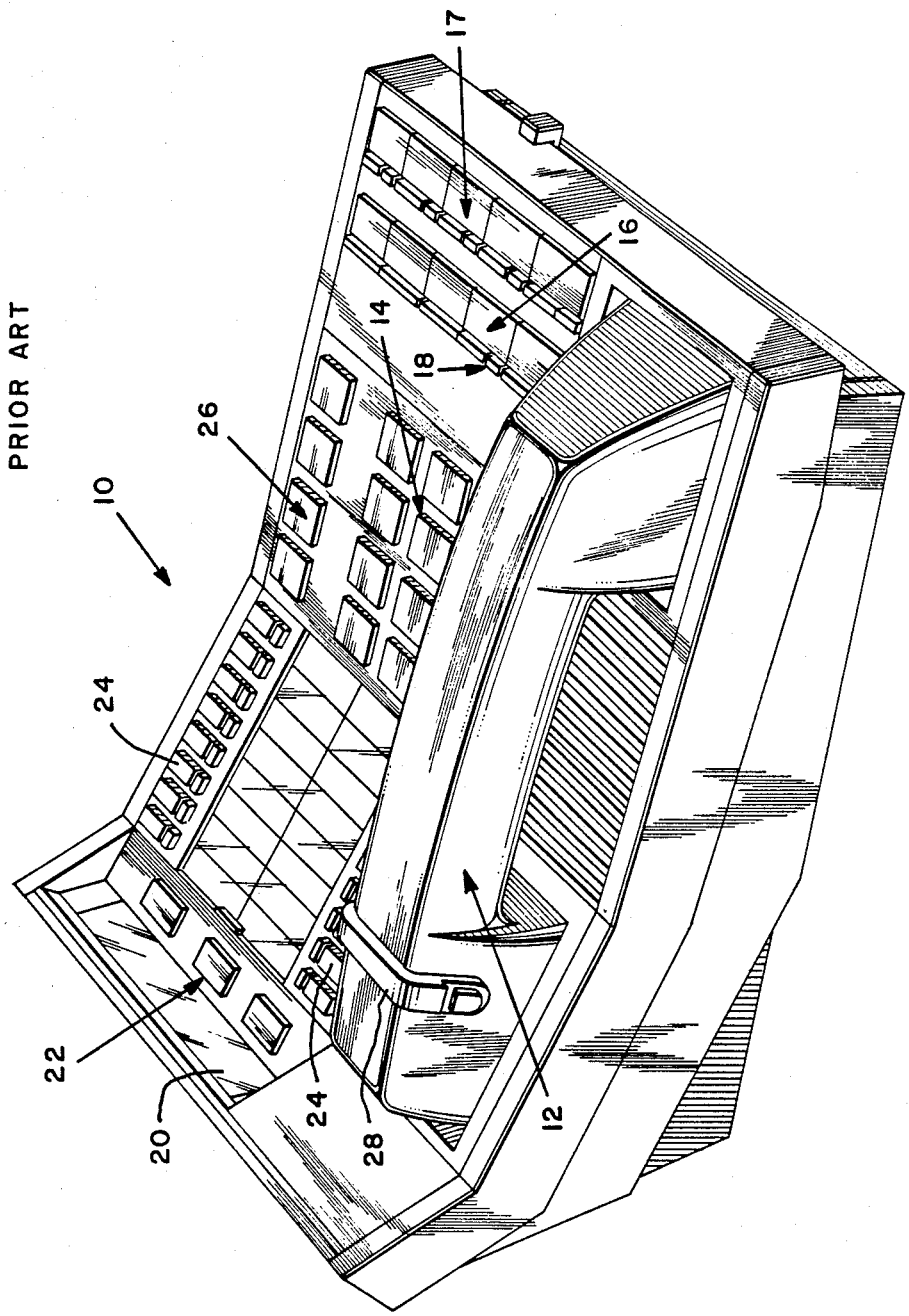
FIG. 1 shows a perspective view of a prior art microprocessor controlled telephone.

FIG. 1 shows a known microprocessor controlled station set of the type described in the above incorporated U.S. patent. Station set 10 includes a handset 12 having a microphone and receiver at opposite ends, a conventional keypad 14, a plurality of programmable input push-button switches 16 and a plurality of indicator lamps 18, each associated with one of switches 16. Other elements of station set 10, which are not relevant to the subject invention, include; dedicated input switches and lamps 17 display 20 for the display of text messages, a plurality of "soft switches" 22 whose function varies and is typically defined by a displayed text message, another plurality of programmable push-button switches 24 generally intended for use with an auto-dial function, still another plurality of push-buttons switches 26 use to implement a calculator function in conjunction with display 20, and dictation controls 28 used when station set 10 is used as a dictation terminal. A hardwire connector (not shown) is provided to connect set 10 to a dictation, or other module (not shown).

As described in the above incorporated U.S. patent, in microprocessor control telephones such as that shown in FIG. 1, the various inputs are scanned by the microprocessor which then controls the function of the station set, as well as any auxiliary devices associated with the station set over a communications channel. Thus, in general, any input may be used to control any function of station set 10 by appropriate programming of the microprocessor. Of course, to facilitate the user interface, the inputs, with the exception of "softkeys" 22 are dedicated to functions such as dialing, auto dialing, dictation, etc. In the subject invention it is contemplated that at least some of push buttons 16 or 24 will be programmed to be used to select one of the telephone lines connected through the multi-line telephone controllers and that the associated indicator lamps 18 will be used to indicate line status.

Figure 2:
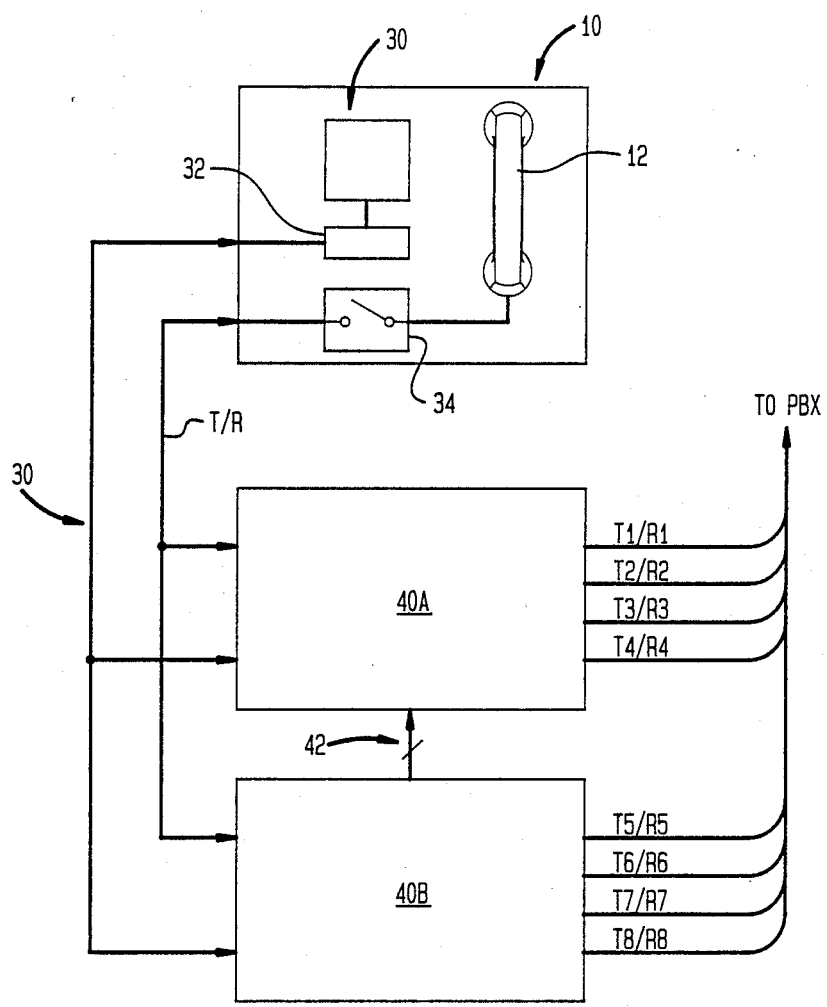
FIG. 2 shows a schematic block diagram of a multi-line telephone in accordance with the subject invention.

In FIG. 2 a multi-line telephone in accordance with the subject invention is shown. Station set 10 includes microprocessor 30 which transmits digital control signals through communications channel 32, as will be described further below. A single telephone input line T/R is connected to handset 12 through conventional audio circuitry and hook-switch 34 in a conventional manner. Line T/R and databus 36 are connected in parallel to multi-line telephone controllers 40a and 40b. Controller 40a is in turn connected to telephone lines T1/R1–T4/R4, and controller 40b is connected in the same manner to lines T5/R5–T8/R8.

Since databus 36 and line T/R are connected in parallel, all signals from station set 10 will be applied to both controllers 40a and 40b, and all signals from controllers 40a and 40b are transmitted over the same lines in bus 36 and telephone line T/R. Controllers 40a and 40b are essentially identical, and each include capabilities for controlling either telephone lines T1/R1-T4/R4 or lines T5/R5-T8/R8 and for transmitting the lines status of all telephone lines to station set 10. Signal contention is avoided by a polarized interconnecting cable 42, which carries the status information from controller 40b to controller 40a. Appropriate connection of cable 42 activates enable means in controller 40a and deactivates enable means in controller 40b so that line status information is only transmitted from controller 40a, and controller 40a only responds to control signals relating to telephone lines T1/R1-T4/R4 while controller 40b only responds to signals relating to lines T5/R5-T8/R8. This configuration makes it possible to use identical controllers without the need to separately address each controller, as will be described further below.

Turning to FIGS. 4-10, a detailed schematic diagram of a multi-line telephone controller is shown. In FIG. 4, up to four telephone lines from a central office or other switching equipment such as a PBX are connected through connector J1. Connector J2 is wired in parallel to connector J1, but with a different pin configuration, in a manner which allows up to four telephone lines to be connected using a pair of two lined cables. Connector J8 is provided to allow connection to an auxiliary modem and is not relevant to the subject invention.

Each telephone line is connected to one of ring detection circuits 50,60,70 or 80 which provide a ring enable output for each corresponding telephone line. The four ring enable signals are connected to four inputs of an 8 bit parallel to serial convertor U40, shown in FIG. 6 and all eight inputs are connected through connector J3, shown in FIG. 8, for docking with a second multi-line telephone controller, as will be described further below. Resistors R19-R21 and R43 are provided as pull downs for the remaining four inputs.

Figure 5:
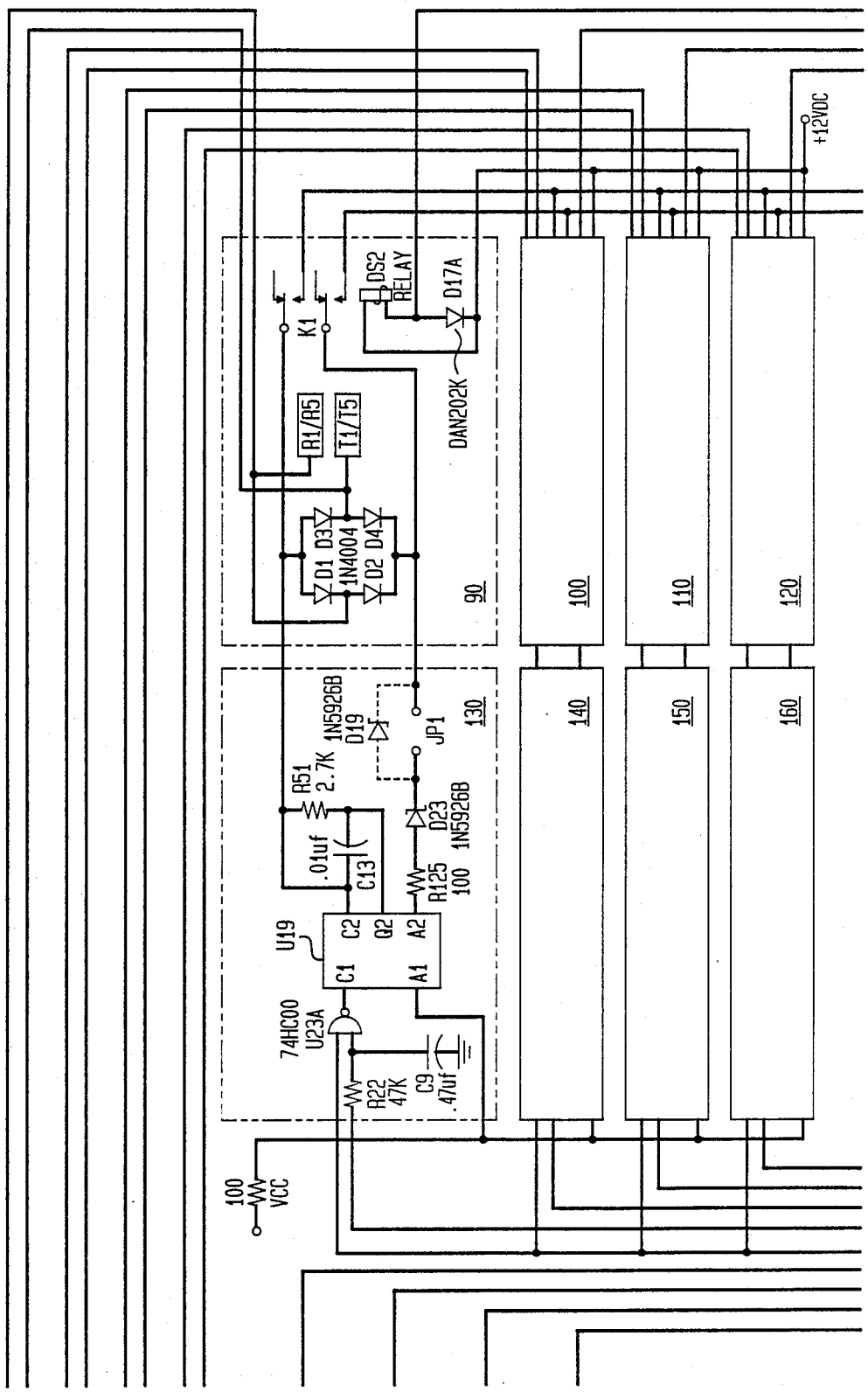

Each telephone line is also connected to switching circuitry 90,100,110, or 120, shown in FIG. 5, for selective connection to station set 10 through line T/R.

Hold circuitry 130,140,150 and 160, shown in FIG. 5, are respectively connected across each telephone line pair to clamp the potential across a selected telephone line pair to a preselected distinctive hold potential, as will be described further below.

Each telephone line is also connected to one of indicator control signal generators 170,180,190, or 200, shown in FIGS. 9 and 10, which are responsive to the voltage across the associated telephone line pair to produce an indicator control signal corresponding to the seized, on-hook, hold, or ringing state of the telephone line, as will be described further below.

Preferably a seized telephone line is indicated by a constantly on indicator, a on-hook line is indicated by a constantly off indicator signal, and hold and ringing lines are indicated by different time varying on off pattern signals.

Figure 6:
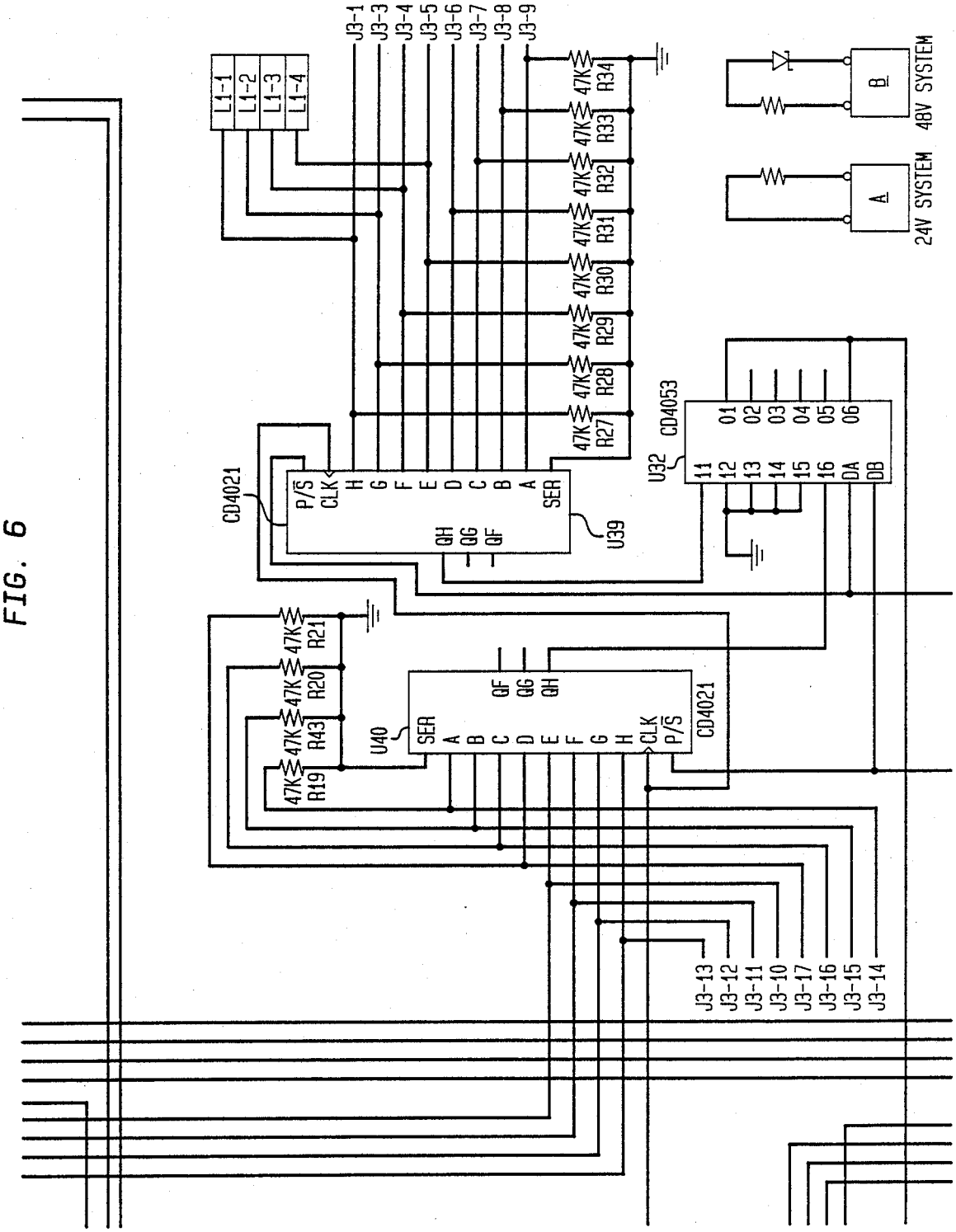
Figure 7:
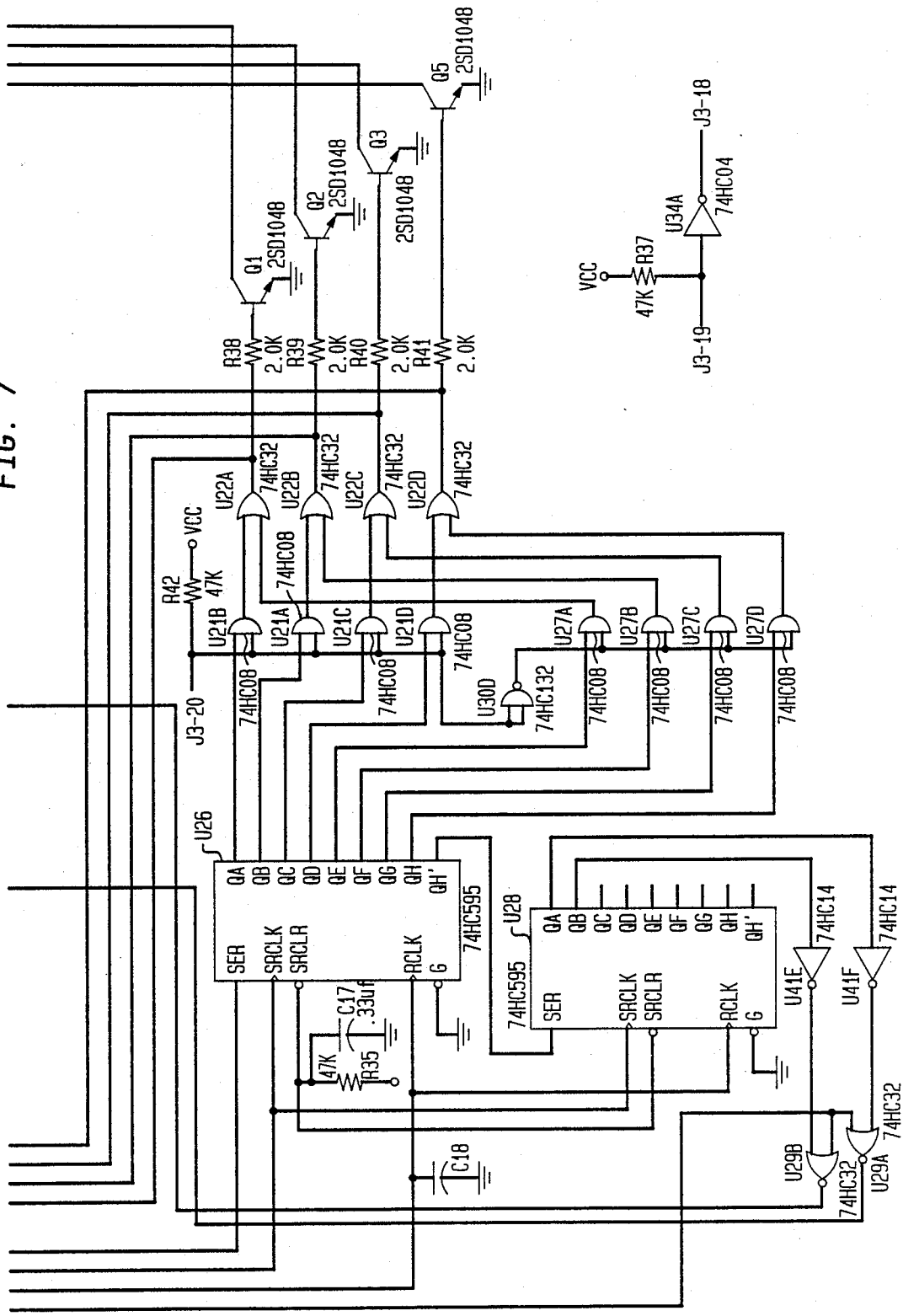
Figure 8:
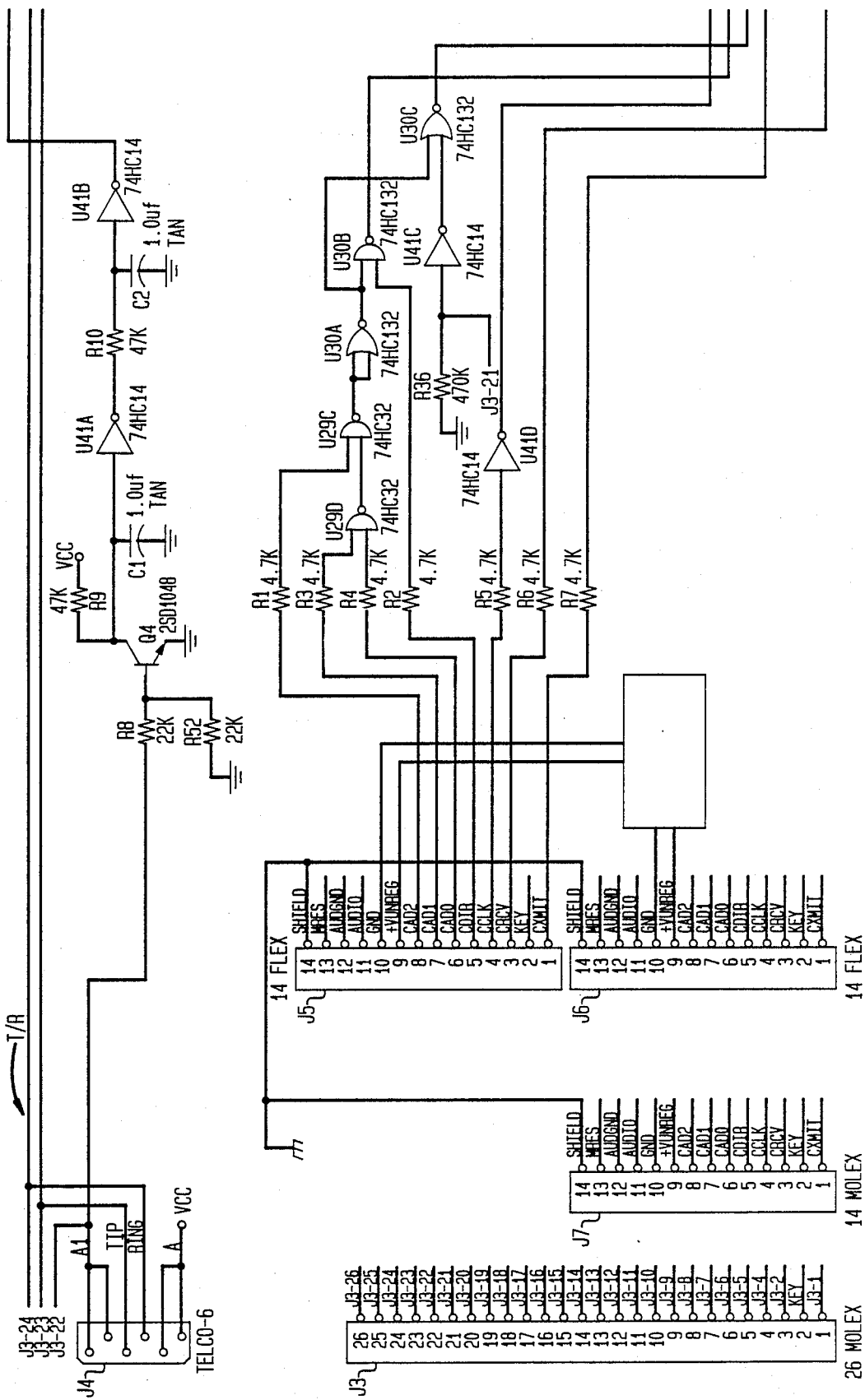

The four indicator control signals are connected to four inputs of 8 bit parallel to serial convertor U39, shown in FIG. 6. All eight inputs of convertor U39 are connected to connector J3 for interconnection with another multi-line telephone controller, as will be described further below. Resistors R27-R34 are provided as pull downs.

Connection to line T/R is through connector J4, which also carries conductors A and A1, which are connected to a relay in station set 10. Connector J4 is also connected through connector J3 for use with another telephone controller, as will be described further below.

Connection to the communications channel of station set 10 is through connector J7. Connectors J5 and J6 are wired in parallel to connector J7 to allows communications bus 36 to be extended onto another telephone controller, as well as other auxiliary devices. Both connectors J5 and J6 are provided since it has been found preferable to use a connector for connections between auxiliary devices which is physically different, though electrically the same as, connector J7 used to connect to station set 10.

The connections to connectors J5-J7 are defined in Table 1 below:

TABLE 1

| Pin | Name |
|---|---|
| 1 | CXMIT - Serial Data Out |
| 2 | KEY - Polorizing Key to Prevent Reverse Connection |
| 3 | CREV - Serial Data In |
| 4 | COLK - Cbck Signal |
| 5 | CDIR - Data Flow Direction |
| 6,7,8 | CAD 0,1,2 - Address Bits |
| 9 | VONREG - Unregulated Voltage Source |
| 10 | GND - Ground |
| 11 | AUDIO - Unused |
| 12 | AUDGNO - Unused |
| 13 | MRES - Unused |
| 14 | SHIELD - Cable Shield. |

Communications between station set 10 and the telephone line controller are controlled by microprocessor 30. Microprocessor 30 periodically, and preferably once approximately every 30 milliseconds, asserts a predefined address for the telephone line controller, which is decoded by gates U29d, U29c, U30a, U30b, shown in FIG. 8, to enable serial to parallel convertors U26 and U28 which are connected in series to receive a 16 bit serial data word, as defined below:

| $L_1$ $L_2$ $L_3$ $L_4$ $L_5$ $L_6$ $L_7$ $L_8$ EL ER X X X X X X |
|---|
| $L_1$-$L_8$ - Seizes corresponding line T1/R1 - T8/R8 |
| EL - Enables indicator control signal status to be read |
| ER - Enables ring status to be read |
| X - Unused |

Microprocessor 30 then reads in a serial 8 bit word from either parallel to serial convertor U40, to determine ring status of each telephone line, or convertor U39 to determine the status of the indicator control signal associated with each telephone line, depending upon which input to tri-state device U32, shown in FIG. 6, is enabled through gates U29a and U29b and invertors U41e and U41f (74HC14) by bits 9 and 10 of the previous output word.

Note that gates U29a and U29b are enabled by the output of gate U30a when the proper address is decoded, through gate U30c. When two multi-line telephone controllers are connected in parallel to provide an eight line telephone line controller, either a high or a low potential is provided on pin J3-21. For the controller controlling lines T1/R1-T4/R4, a low potential is provided by a jumper which connects pin J3-21 to pin J3-18, which is held low by invertor U34a. This low potential enables gate 30c through invertor U41c so that gates U29a and U29b are enabled each time the telephone line controller is addressed. (In the absence of a connection to J3, the low potential is provided through resistor R36.) For the controller which controls lines T5/R5 through T8/R8, a high potential is provided on pin J3-21 disabling gate U30c and thus, gates U29a and U29b so that tri-state device U32 is disabled.

Since polarized cable 36 is wired so that the ring status and indicator control signals from controller 40b are connected to the unused inputs of convertors U40 and U39 in controller 40a, line status data for all telephone lines will be received only from controller 40a with each input data word.

Station set 10 controls an audible signal in response to the ring status of each line connected through the telephone line controller. Note that station set 10 need not be programmed to generate an audible signal for each line in a ringing state. For example, with two station sets connected to a common telephone line, one may be programmed as the primary station set, and ring immediately when it detects a ringing state, and the other programmed to "roll over" and ring only if the line is not seized within a specified number of rings.

Station set 10 also controls the indicators, typically LED's, directly in accordance with the state of the indicator control signals received each time data from convertor U39 is read. Since data is read so frequently from the telephone line controller, the indicators will appear to track the signals generated by signal generators 160-200.

Microprocessor 30 controls line selection by transmitting a 16 bit serial data word to serial to parallel convertors U26 and U28. Bits 1-4 control relays K1-K4 (shown in FIG. 5) through transistors Q1-Q4, gates U21a-U21d and gates U27a-U27d, shown in FIG. 7. Bits 5-8 may also control relays K1-K4 through gates U27a-U27d. Gates U21 or U27 are selected by the voltage level applied to pin J3-20. When two controllers 40 are connected, the controller controlling the first 4 lines will have a high level applied to pin J3-20 by the intraconnecting cable, enabling gates U21 and disabling gates U27 while the other controller will have a low level applied to pin J3-20. When a controller is used alone, a high level is maintained on pin J3-20 by resistor R42.

Bits 9 and 10 of the serial data word control gates U29a and U29b to select either ringing status or the indicator control signal through tri-state device U32 the next time status is read by microprocessor 30.

The above circuitry will be described in more detail below with respect to the description of the operation of the telephone controller of the subject invention.

Receiving a Call

When a central office receives a call for a particular telephone line it first determines if the line is seized or on hold by measuring the loop current between tip and ring in a conventional manner well known to those skilled in the art. If no current is detected (i.e. the line is not busy) a ring signal is generated by the central office on that particular telephone line. Assuming that the selected line were connected to line T4/R4, the ring signal would be applied to ring detectors circuit 50. MOV device VA3 may also be connected across T4/R4 to provide additional over voltage protection. The ring signal is detected by integrated circuit U35, which is preferably a Texas Instrument Model No. TCM 1520 AP. When the ring signal is detected, a ring enable signal is generated by phototransistor Z1B through invertor U34C. The ring enable signal is applied to parallel to serial convertor U40 and to indicator control signal generator 200.

As noted, indicator control signal generators 170, 180, 190, and 200 provide indicator control signals representative of the seized, on-hook, hold, and ringing state of the corresponding telephone lines. (For reasons of ease in laying out the schematic drawings, the operation of the remaining portions of the circuitry of controller 40 will be described with respect to line T1/R1. Note that substantially identical circuitry is provided for each telephone line connected to controller 40.) The ring enable signal is applied to gate U7C and ANDED with the output of ring oscillator 210, shown in FIG. 10. Oscillator 210 is a conventional oscillator and typically will provide a square wave output having a one second period and a 50% duty cycle. The output of gate U7C is "ORED" with the outputs of diodes D29a and D29b to generate the indicator control signal on line L1-1. Line L1-1 is connected to an input of parallel to serial convertor U39 and is normally pulled low by a resistor R27. A seized signal is provided through diode D29a and a hold signal is provided through diode D29b to provide the other conditions for enabling the indicator. Since the central office would not generate a ring signal, if the line were busy (i.e. seized or on hold) only the combination of the ring enable signal and the ring oscillator will appear on line L1-1. Preferably the ring enable is provided through an integrator consisting of diode D28 resistor R69 and comparator C37 to filter out the off state of the ring signal so that the indicator control signal tracks the output of ring oscillator 210 when the line is ringing.

As noted, microprocessor 30 periodically communicates with controller 40. Microprocessor 30 communicates by setting address lines CAD0 through CAD2 to a predetermined address (shown as 000), which is decoded by gates U29d, U29c and U30a and combined with CDIR by gate U30b to enable serial to parallel convertors U26 and U28. As noted microprocessor 30 then transmits a 16 bit serial data word over CXMIT and provides a clock signal on CCLK to shift the word into U26 and U28. Processor 30 then reads either the contents of parallel to serial convertor U39 or U40, depending upon the state of bits 9 and 10 of the previously transmitted word. CDIR is turned off and an eight bit word from either U39 or U40 is transmitted through tri-state device U32 in accordance with the state of bits 9 and 10. Typically, 8 bits comprising the values of the indicator control signals for each telephone line are read from parallel to serial convertor U39 overline CRCV and microprocessor 30 enables or disables the signals in accordance with the value of each associated indicator control. As noted, since communications preferably occur with a cycle time of approximately 30 milliseconds, the indicator lamps will appear to track the value of the corresponding indicator control signal; and for a ringing line will blink with a one second cycle, 50% on time.

Preferably, once every communication cycle microprocessor 30 will select parallel to serial convertor U40 and read in an 8 bit word indicating the ring status of each telephone line. Processor 30 then controls the audible signal generator of station set 10 in response to the status of the ring enable signals. Note that processor 30 may be easily programmed to respond differently to a ringing condition on different lines. Thus, ringing on one line may be suppressed when another line is seized and one or more lines may be designated as primary lines where an audible signal is generated immediately while other lines "roll over"; that is an audible signal is only generated after a specified number of lines is allowed for someone to pick up on another, primary station set.

Assuming someone wishes to respond to either the audible tone generated by a station set or a flashing indicator, that person would select the line indicated by the flashing indicator by pressing one of the corresponding buttons 16 shown in FIG. 1. Microprocessor 30 responds to this input by transmitting the next data word to serial to parallel convertors U26 with the appropriate bit set. Continuing to assume that the corresponding line is line 1, gate U21b would be asserted and transistor Q1 turned on through OR gate U22. Relay K1 would then connect T/R to telephone lines T1/R1. When the person then picks up handset 12, the impedance of station set 10 is connected across lines T1 and R1. The central office will detect current flow in the telephone line and discontinue the ringing signal and a voltage corresponding to a seized condition will be established across T1/R1. At this point the caller and the person picking up may begin a conversation.

Returning to indicator control signal generator 170, the voltage across T1/R1 is applied through resistors R53 and R54 to operational amplifier U17a. The gain of amplifier U17a, which is determined by a feedback network consisting of R118, R119, R55, R58, and a bias circuit connected through connector J9 to resistors R58 and R59, provides nominal voltage outputs for different line conditions as set forth in Table 2 below.

TABLE 2

| Line Condition | Normal Polority −48 volt (−24 volt) | Reverse Polarity −48 volt (−24 volt) |
|---|---|---|
| Seized | 7.08 (7.25) | 5.11 (4.72) |
| Hold | 8.22 (8.51) | 3.46 (3.46) |
| On Hook | 9.70 (9.77) | 2.48 (2.20) |
| No Connection | 10+ (10+) | 10 (10+) |

(Note that for nominal minus 48 volt installations, pins 2 and 3 on connector J9 are connected and jumper JP5 is installed. For nominal minus 24 volt installations, pins 1 and 2 maybe connected on connector J9 and jumper JP5 removed to adjust the gain of operational amplifier U17a.)

Figure 9:
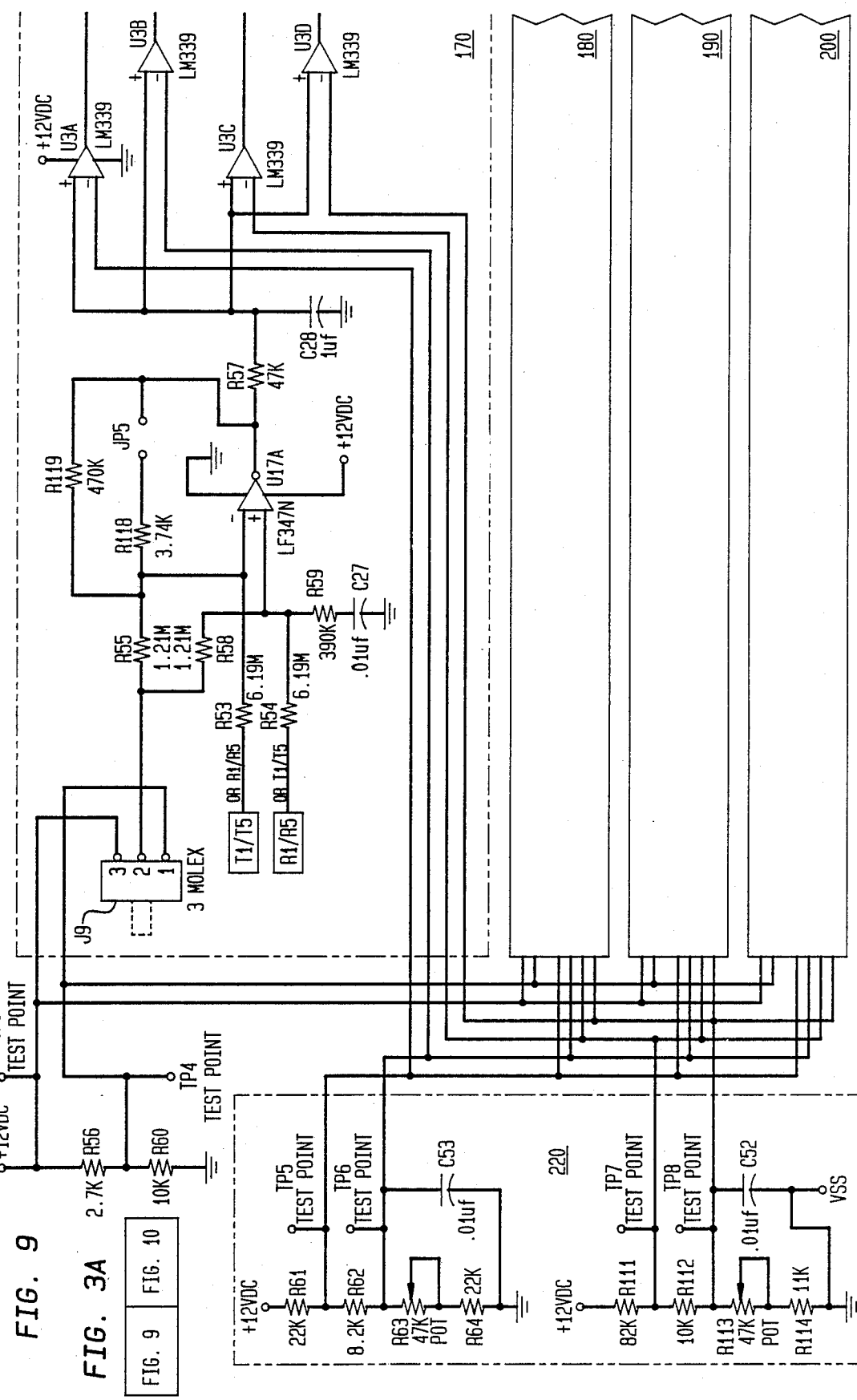
Figure 10:
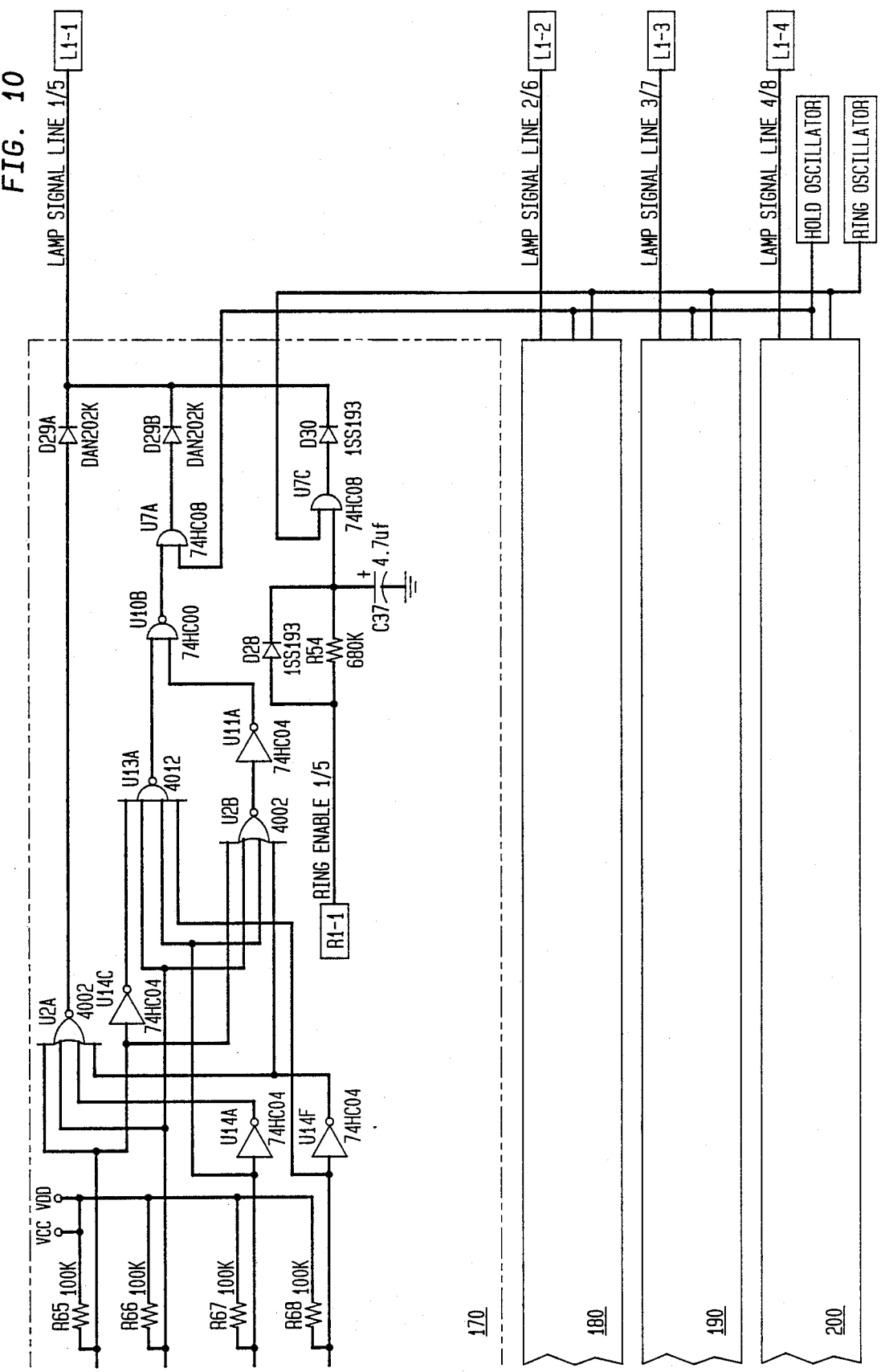

The output of operational amplifier U17a is applied to 4 comparators U3a–U3d, which compare the output to four reference levels generated by reference circuit 220, shown in FIG. 9. The outputs corresponding to various line conditions are set forth in Table 3 below.

TABLE 3

| Comparator (Shown in FIG. 8) | No Connection | | On Hook | | Seized | | Hold | |
|---|---|---|---|---|---|---|---|---|
| | Normal | Rev | Normal | Rev | Normal | Rev | Normal | Rev |
| U3a | 1 | 1 | 1 | 0 | 0 | 0 | 0 | 0 |
| U3b | 1 | 1 | 1 | 0 | 0 | 0 | 1 | 0 |
| U3c | 1 | 1 | 1 | 0 | 1 | 1 | 1 | 0 |
| U3d | 1 | 1 | 1 | 0 | 1 | 1 | 1 | 1 |

Reference levels may be adjusted by potentiometers R63 and R113 to compensate for changes in nominal operating line voltages.

When the seized condition is detected through invertors U14a and U14f and gate U2a, a seize signal is ORed onto line L1 through diode B29a. This signal remains asserted so long as the line is seized, and thus, the associated indicator lamp 18 will remain on so long as the line is seized.

Placing the Call

To place a call a user simply selects a line by pressing one of buttons 16 which, assuming again, line T1/R1, causes relay K1 to connect line T/R to line T1/R1 as described above. If the user then picks up handset 12, or has previously picked up handset 12, the line will be seized and the corresponding indicator will be activated as described above. The user may then place the call in response to a dial tone in the conventional manner.

Hang-Up

A user may hang-up either by replacing the handset or deselecting an active line using one of buttons 16. If a line is deselected processor 30 will write the next word to serial to parallel, convertor U26 with a zero value for the appropriate bit to release that line. In either case, the voltage on the associated telephone line will go to the on-hook (or no connection) value as shown in Table 2. This value is not detected by the logic associated with comparitors U3a–U3d and no signal is asserted on line L1-1, and the associated indicator lamp is off.

Hold

A line which has been seized may be placed on hold if a user wishes to use another line without breaking the connection on the first. A user places a seized line on hold by pressing one of the buttons 16, which has been designated as the hold button. Microprocessor 30 responds by opening relay A/A1 which is connected with controller 40 through connector J4. Opening this relay in station set 10 removes the bias current from transistor Q4 and the resulting signal is coupled through invertors U41a, integrated R10/C2, and invertor U41b. Still assuming that the seized line is line T1/R1 the signal is coupled through gate U23a which has been enabled by gate U22a when the line was seized to trigger opto-scr U19. The corresponding gates in hold circuits 140,150, and 160 are not enabled since those lines are assumed not seized. When opto-scr U19 fires zener diodes D23 and D19 clamp the voltage across line T1/R1 to the hold voltage. This voltage is distinct from the seized voltage and is recognized by comparators U3a–U3b while a current flow is maintained so that the central office continues to maintain the connection of the line on hold. When microprocessor 30 recognizes that the hold button has been pressed, it also transmit the next status word to serial to parallel convertors U26 and U28 with the appropriate bit set to zero to release line 1. This zero signal is coupled through gates U21b and U22a to U23a through integrator R22/C9 which provides an approximate 40 millisecond delay. At this point relay K1 opens and the user may select another line by pressing the appropriate one of buttons 16.

To take line T1/R1 out of hold, a user need only reselect the line on any station set connected to that line, or go "off-hook with a conventional single line telephone connected to that line, dropping the voltage across the line below the SCR threshold and causing opto-scr U19 to open.

Jumper JP1 is provided in hold circuit 90 to allow adjustment between nominal minus 48 volt equipment and nominal minus 24 volt equipment by appropriate selection of jumpers, shown in FIG. 6, A (for −24 volt operation) or B (for −48 volt operation).

A hold condition is detected by indicator control signal generator 170 by comparators U3a–U3d and the decoder logic formed from invertors U14a, U14f, U14c, and U11a and gates U2b, U13a, U10b and U7a. This circuit recognizes a hold condition for both normal and the reverse polarity on line T1/R1. Gate U7a AND's the hold signal with the output of hold oscillator 230, which is a conventional oscillator having a square wave output distinct from the output of ring oscillator 210, and preferably with a half second period and a 90% on time. The output of gate u7a is ORED with the seized and ringing signals through diode D29b to form the indicator control signal on line L1-1.

Interconnection of Controllers

As shown in FIG. 2, two identical multi-line telephone controllers 40a and 40b maybe connected in parallel to communications bus 36 and line T/R to provide the capability to control up to 8 telephone lines, T1/R1–T8/R8. Since controllers 40a and 40b are identical, they will respond to the same address on lines CAD0–CAD2, and accordingly, a polarized interconnecting cable 42 is provided to prevent signal conflicts. When properly connected cable 42 establishes controller 40a to control lines T1/R1–T4/R4, and controller 40b to control lines T5/R5–T8/R8. As discussed above, cable 42 is jumpered to apply a high voltage developed through resistor R37 on pin J3-19 to pin J3-20, and a low voltage developed through invertor U34a on pin J3-18 to pin J3-21 for connector 40a and jumpered to provide the opposite levels for connector 40b. In connector 40a gates U21a–U21d are enabled and gates U27a–U27d are disabled through gate U30d. Gates U29a and U29b are also enabled in connector U40a. In connector U40b gates U21a–U21d are disabled and gates U27a–U27d are enabled, and gates U29a and U29b are disabled. Thus, controller U40a is responsive only to bits 1–4 of a data word transmitted from microprocessor 30 while controller U40b is responsive only to bits 5–8.

Further, polarized cable 42 is also wired so that the ring status and indicator control signals from each controller are connected to the unused inputs of serial to parallel convertors U40 and U39 respectively in the other controller. Thus, each controller will transmit an 8 bit data word to microprocessor 30 containing either the ring status of indicator control signals for all 8 lines; however, since gates U29a and U29b are disabled in controller 40b, tristate device U32 will be enabled only in controller 40a and only data from controller 40a will be received by microprocessor 30.

The above preferred embodiments have been described only by way of example, and those skilled in the art will readily recognize numerous other embodiments within the scope of the subject invention. Accordingly, limitations on the scope of the subject invention are to be found only in the claims set forth below.

What is claimed is:

1. A multi-line telephone controller for controlling the connection of a predetermined number, n, of telephone lines to a station set, said station set including, input means for connecting a telephone line, means for establishing seized or on-hook conditions for a telephone line connected to said input means, user input means for input of user signals to select a telephone line, communications means for communicating with said controller, and processor means for transmitting and receiving information through said communications means and for controlling said station set and said controller in accordance with said received information and said user signals, said controller comprising:
    (a) n ring detector means, each connected to one of said n telephone lines, each for generating a ring enable signal in response to a ring signal on said one connected line,
    (b) ring status transmission means responsive to said ring enable signals for transmitting the ring status of said n telephone lines to said processor means through said communications means; and,
    (c) switching means for connecting a selected one of said n telephone lines to said input means in accordance with line selection signals transmitted by said processor means through said communications means.

2. A controller as described in claim 1 further comprising n signal generator means each connected to one of said n telephone lines and responsive to the voltage level on said one connected line for generating an indicator control signal corresponding to the seized, on-hook, or ringing status of said one connected line, said indicator control signals each controlling one of n indicators.

3. A controller as described in claim 2 wherein said indicator control signals control said indicators to produce distinctive on/off patterns to indicate the status of said n telephone lines.

4. A controller as described in claim 3 wherein said seized status is indicated by a continuously on indicator, said on-hook status is indicated by a continuously off indicator, and said ringing status is indicated by a first time varying on/off pattern.

5. A controller as described in claim 4 wherein said indicators are comprised in said station set and are directly controlled by said processor means in accordance with said indicator control signals, said controller further comprising line status transmission means responsive to said indicator control signals for transmitting the line status of said n telephone lines to said processor means through said communication means.

6. A controller as described in claim 2 wherein said station set further includes hold signal means for input of hold signals by a user and said processor means is further responsive to said hold signals, said controller further comprising hold means responsive to said hold signal means for establishing a hold condition on one of said n telephone lines which has been seized and then disconnecting said seized line from said input means so that another of said n telephone lines may be selected for connection to said input means.

7. A controller as described in claim 6 wherein said hold condition establishes a voltage on said seized then disconnected line which is distinct from the voltage levels of telephone lines which are seized, on-hook or not connected, and wherein said n signal generating means are further for generating said indicator control signals corresponding to the seized, on-hook, ringing or hold status of said connected telephone lines.

8. A controller as described in claim 7 wherein said indicator control signals control said indicators to produce distinctive on/off patterns to indicate the status of said n telephone lines.

9. A controller as described claim 1 wherein said seized status is indicated by a continuously on indicator, said on-hook status is indicated by a continuously off indicator, said ringing status is indicated by a first time varying on/off pattern, and said hold status is indicated by a second time varying on/off pattern.

10. A controller as described in claim 9 wherein said indicators are comprised in said station set and are directly controlled by said processor means in accordance with said indicator control signals, said controller further comprising line status transmission means responsive to said indicator control signals for transmitting the line status of said n telephone lines to said processor means through said communication means.

11. A controller as described in claim 1 wherein said station set further includes hold signal means for input of hold signals by a user and said processor means is further responsive to said hold signals, said controller further comprising hold means responsive to said hold signal means for establishing a hold condition on one of said n telephone lines which has been seized and then disconnecting said seized line from said input means so that another of said n telephone lines may be selected for connection to said input means.

12. A controller as described in claim 11 wherein said hold means comprises said switching means, said switching means being responsive to further line selection signals to deselect and disconnect said seized line.

13. A multi-line telephone comprising:
(a) a microprocessor controlled station set, said station set including communications means for communicating with multi-line telephone controllers;
(b) a plurality of multi-line telephone controllers, each of said controllers including a plurality of means for controlling the connection to said station set of one line, selected from a group of telephone lines, the number of said controlling means for each of said controllers being at least equal to the number of said controllers; and
(c) enabling means for enabling one of said controlling means for each of said controllers, each of said enabled controlling means controlling a different group of telephone lines.

14. A multi-line telephone as described in claim 13 wherein each of said telephone controllers includes means for transmitting the status of each group of telephone lines, and further comprising second enabling means for enabling said status transmitting means in a first one of said telephone controllers and disabling said status transmitting means in all remaining telephone controllers so that status for all said telephone lines is transmitted through said first telephone controller.

15. A multi-line telephone as described in claim 14 further comprising polarized interconnecting means for transmitting telephone line status information to said first telephone controller from said remaining telephone controllers, connection of said interconnection means to said first and remaining telephone controllers with correct polarities activating said first and second enabling means.

* * * * *